Figure 1:
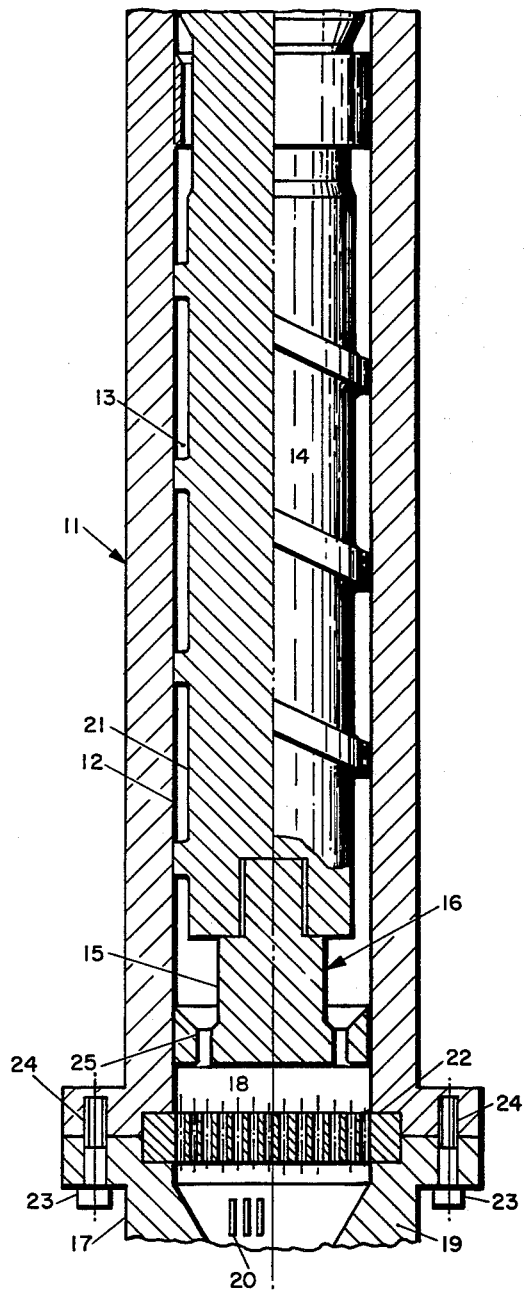

RICHARD L. MOYER
*INVENTOR.*

BY Ernest G. Peterson
AGENT

United States Patent Office 3,171,160
Patented Mar. 2, 1965

3,171,160
EXTRUSION APPARATUS
Richard L. Moyer, Newark, Del., assignor to Hercules Powder Company, Wilmington, Del., a corporation of Delaware
Filed May 31, 1962, Ser. No. 198,892
2 Claims. (Cl. 18—12)

This invention relates to an extrusion apparatus and, more particularly, to an apparatus for simultaneously homogenizing and extruding plastic material.

In customary screw type extrusion apparatus, the extrusion mass is impelled by a power-driven feed screw in a cylinder bore toward and through an extrusion die, the screw desirably simultaneously continuously advancing, mixing, and extruding the material.

Conventional mixer-extruder devices have been designed with various types of mixing torpedoes, mixing heads, baffles, or other devices in conjunction with a conventional extruder screw. Such devices require high pressures to be applied by the screw to advance the material through the mixing devices. High pressures mean high power input to the screw, and such pressures in some cases also cause degradation of the plastic material. In addition, such machines, although improving the mixing ability of the screw, have certain inherent disadvantages. For example, circumferential interruptions prevent scraping of that portion of the cylinder bore which lies adjacent to the interruptions and thus allow prolonged contact of a portion of the plastic feed with the hot cylinder bore. This situation results in overheating and even degradation of heat-sensitive plastics, as well as nonuniformity of temperature and, hence, uneven flow of the plastic through the extruder head. Uneven flow causes considerable difficulty when uniform pellets are to be cut from the extrudate as it emerges from the die. Ostensibly, nonhomogenity of extrudate temperature permits flow (in a multi-hole die) through some die holes at a higher rate than through others due to variations in viscosity caused by nonuniformity of temperature.

An object of this invention is to provide a screw type extruder which incorporates means for producing more uniform mixing and, hence, a more uniform temperature throughout the plastic material as it is fed to the extrusion head. An advantage of the apparatus of this invention is that it is capable of producing well-mixed plastic material at high output and with relatively low energy input to the apparatus. Another advantage is that the apparatus does not generate excessive pressure during the mixing and extruding operations.

In accordance with this invention there is provided an extrusion apparatus which includes an elongated cylinder having a longitudinally extending bore therein, a feed screw concentrically mounted for rotation within the cylinder bore, an apertured mixer plug fixedly attached to the feed screw perpendicular to the screw axis at the discharge end of the screw, and an extrusion head. The apertured mixer plug has a diameter approximately the same as, i.e., of close tolerance to, that of the cylinder bore and has a plurality of apertures of substantially equal area spaced substantially uniformly along a circle intermediate the periphery of the plug and the axis of the screw. The extrusion head has inlet and outlet means, is mounted perpendicular to the cylinder bore at its discharge end, and retains an apertured extrusion die in the outlet means.

Figure 2A:
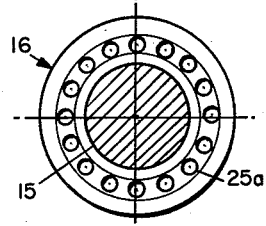
Figure 2B:
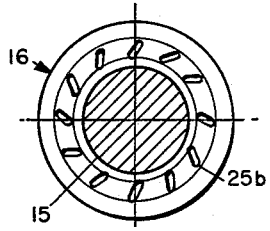
Figure 2C:
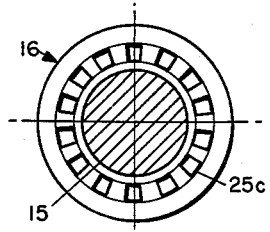

The invention, both as to construction and operation, will best be understood by reference to the accompanying drawing in which FIGURE 1 is a diagrammatic drawing partly in section of the apparatus of the invention, and FIGURES 2a, 2b, and 2c are sectional views showing various types of apertured mixer plugs 16 useful in the apparatus of FIGURE 1.

Referring now to the drawing, and more particularly to FIGURE 1, the apparatus comprises an extrusion cylinder 11 composed of a cylinder wall 12 and a bore 13, a feed screw 14 concentrically mounted in the cylinder bore 13, an apertured mixer plug 16 attached to the screw at the discharge end of the cylinder by means of core 15, and an extrusion head 17 having the usual stock passage 18 to an extrusion die 19 having apertures 20. The screw 14 usually, but not necessarily, has a root axis 21 at least half the diameter of the cylinder bore 13 and is preferably of the compression type. Beyond the feed screw 14 is a screen, strainer, or breaker plate 22 held in place across the discharge end of the extrusion cylinder 11 by head 17 which is secured to the body of extruder by means of bolts which may be inserted or withdrawn through bolt holes 23 and tapped sockets 24. Head 17 may be of any desired form, and may be straight (as shown) or of any gooseneck or L varieties. Any type of extrusion apertures 20 or aperture may be used.

The essential feature of the invention is the apertured mixer plug 16, various embodiments of which are shown in detail in FIGURES 2a, 2b, and 2c. The body of the apertured mixer plug 16 is suitably in the shape of a metal plate or cylindrical block having an outside diameter of close tolerance to that of the diameter of the cylinder bore 13 so as to leave only running clearance for rotation with the screw. The clearance between the mixer plug and the cylinder walls, however, should be insufficient to admit stock material therebetween so that material flow will be continuous toward the passage 18 through the apertures 25. The mixer plug preferably, but not necessarily, is formed with a core or cylindrical extension 15, suitably threaded at its extreme end for detachable connection with the feed screw, the mixer plug thus forming a coaxial extension of the feed screw. Suitably, the diameter of the core or cylindrical extension at the point of attachment is less than that of the root axis 21 of the screw so that a slightly enlarged area or chamber is provided between the end of the screw and the mixer plug. Preferably, the core has a tapered shoulder leading into the apertures 25 to provide a smooth flow of plastic material therein. Alternatively, the mixer plug 16 can be fixedly attached to screw 14 by welding or equivalent means. The mixer plug 16 is provided with a plurality of apertures 25 such as drill holes or openings of other cross-sectional configuration, e.g., square, oblong, rectangular, and the like, uniformly arranged on one or more circles intermediate the periphery of the mixer plug 16 and the core of the plug or the root axis of the screw, whichever the case may be. The apertures 25 preferably have tapered shoulders to provide a smooth flow of plastic material therethrough and are of substantially equal area, the total area of the apertures in mixer plug 16 preferably being such that no throttling effect is produced on the flow of plastic through the apertures 20 in extrusion die 19.

In practice of the invention employing an arrangement of apparatus similar to that shown in FIGURE 1 of the drawing, the extruder is heated by electrical resistance heaters, steam, hot water, oil, or other heat transfer medium in the cylinder wall 12 and the plastic material is fed to screw 14 suitably from or through a hopper (not shown). The screw 14 and attached apertured mixer plug 16 are set in motion by a motor-driven gear (not illustrated) in the conventional manner. In the illustrated modification, rotation is in a direction to move the plastic material to the left. Initial heating and mixing occurs as the plastic feed is advanced through the bore 13 by the screw towards the apertured mixer plug 16. When the plastic material reaches the mixer plug the plastic feed is forced away from the walls of the cylinder and advanced through the apertures 25 of mixer plug 16 which is rotating with the screw. The plastic material under pressure is discharged forwardly through screen, strainer, or breaker plate 22 and thence out through the apertures of the die in the extrusion head in the usual manner.

The apparatus of the present invention comprises at least one mixer plug fixedly attached to the extrusion end of the screw. Additional mixer plugs, however, may be employed at the extrusion end of the screw and/or along the screw at intermediary positions, suitably at from one-quarter to three-quarters of the distance between the feed end and the discharge end of the screw, to even further improve the functioning of the apparatus.

By providing a mixer plug, as described above, that may be adapted to a standard extruder screw or formed integrally therewith, it is possible to obtain not only exceptionally efficient mixing without a marked increase in the power input to a given extruder screw but also thorough and rapid mixing. In many cases no changes in the original driving mechanism will be necessary. Unlike the prior art devices, the mixer plug prevents the formation of a relatively stationary mass of plastic on the inner surface of the cylinder wall and along the screw axis, thus preventing overheating and subsequent thermal or autogenic degradation of the plastic feed.

The following examples are intended to illustrate and not restrict the invention.

EXAMPLE 1

Polyethylene having a reduced specific viscosity (RSV) ranging from about 4.5 to 6.0 (specific viscosity divided by concentration of a 0.1% weight/volume solution of polymer in decahydronaphthalene at 135° C.) was feed to a 6-inch plastics extruder having a single feed screw 12 feet long concentrically mounted within a cylinder bore 6 inches in diameter. A 6-inch diameter apertured mixer plug about 1.75 inches thick provided with a 3.25-inch diameter core was screw mounted to the discharge end of the feed screw so that the mixer plug was positioned about 2.3 inches beyond the end of the screw. The mixer plug was provided with 36 rectangular slots equally spaced along a 4.6-inch circle, each slot extending along the circle for 0.25 inch and extending inwardly toward the center of the plug for 0.375 inch. In order to facilitate discharge of plastic material through the mixer plug, the slots were tapered toward the plug periphery at an angle of 45° and toward the shaft so that the slots provided a channel about 1 inch in length through the plug. The polyethylene was fed continuously to the extruder, heated therein to its melting point, and advanced into the apertures of the mixer plug, the extruder being operated at maximum output. The polyethylene melt was extruded through a die having 108 apertures 0.088-inch diameter and the extrudate cut into pellets as it emerged from the die. Pellet uniformity and extrusion data as compared when used with the same extruder without the mixer plug are set forth in Table I.

Table I

| | Without Mixer Plug | With Mixer Plug |
|---|---|---|
| Extrusion screw revolutions per minute (r.p.m.). | 80 | 100. |
| Extrusion screw head end pressure (p.s.i.). | 1,600–3,100 | 2,800–3,800. |
| Extrusion rate (lbs./hr.) | 525 | 805. |
| Torque load (watts) | 500 | 550. |
| Temperature of polyethylene at interval between mixer plug and die (° F.). | 500–525 | 550–570. |
| Pellet uniformity | Nonuniform [1] | Very uniform.[2] |

[1] Pellets varied in length from 2/32″–10/32″.
[2] All pellets measured approximately 3/32″ in length.

EXAMPLE 2

Example 1 was repeated using polyethylene having an RSV ranging from about 0.15 to about 0.25, a 6-inch plastic extruder fitted with a twin screw 10 feet long, and a mixer plug similar to that of Example 1 except that it was provided with 30 elongated holes having semicircular ends. The elongated holes were equally spaced around the plug so that the longitudinal axis of each hole was disposed at an angle of 45° from a diameter passing through the center of the innermost semicircle and the mixer plug. The innermost semicircular ends were spaced on a 4.25-inch circle, the outer semicircular ends on a 4.672-inch circle, and the semicircular ends had a radius of 0.125 inch. Pellet uniformity and extrusion data as compared when using the same extruder without the mixer plug are set forth in Table II.

Table II

| | Without Mixer Plug | With Mixer Plug |
|---|---|---|
| Extrusion screw revolutions per minute (r.p.m.). | 125 | 125. |
| Extrusion screw head end pressure (p.s.i.). | 2,600 | 1,800. |
| Extrusion rate (lbs./hr.) | 2,165 | 2,800. |
| Torque load (in./lbs.) | 110,000 | 90,000. |
| Temperature of polyethylene at interval between mixer plug and die (° F.). | 490 | 515. |
| Pellet uniformity | Nonuniform [1] | Very uniform [2] |

[1] Pellets varied in length from 2/32–10/32″.
[2] All pellets measured approximately 3/32–5/32″ in length.

EXAMPLE 3

Example 2 was repeated using polyethylene having an RSV of about 0.4 to about 0.8. Pellet uniformity and extrusion data are set forth in Table III.

Table III

| | Without Mixer Plug | With Mixer Plug |
|---|---|---|
| Extrusion screw revolutions per minute (r.p.m.). | 125 | 125. |
| Extrusion screw head end pressure (p.s.i.). | 2,900 | 2,100. |
| Extrusion rate (lbs./hr.) | 2,300 | 2,800. |
| Torque load (in./lbs.) | 130,000 | 117,000. |
| Temperature of polyethylene at interval between mixer plug and die (° F.) | 480 | 500. |
| Pellet uniformity | Nonuniform [1] | Very uniform |

[1] Pellets varied in length from 2/32–10/32″.
[2] All pellets measured approximately 3/32″ in length.

What I claim and desire to protect by Letters Patent is:

1. In an apparatus for homogenizing and extruding plastic material, the combination comprising an elongated cylinder having a longitudinally extending bore therein, a feed inlet for plastic feed material adjacent to one end of the cylinder bore, an apertured extrusion die adjacent to the other end of the cylinder bore, a rotatable helically threaded screw disposed within the cylinder bore and extending from the feed inlet to near to the die, and, within said cylinder bore, an apertured mixer plug having a diameter approximately the same as the inside diameter of said cylinder bore and fixedly attached to said screw perpendicular to the axis of said screw at the end adjacent to said extrusion die and rotatable with said screw, said apertured mixer plug being spaced from said die and having a plurality of apertures of substantially equal area spaced substantially uniformly along a circle intermediate the periphery of said plug and the axis of said screw.

2. The apparatus of claim 1 wherein the total area of the apertures in said mixer plug is at least equal to the total area of the apertures in said die.

References Cited by the Examiner

UNITED STATES PATENTS

| | | | |
|---|---|---|---|
| 643,547 | 2/00 | Smith | 146—189 |
| 1,217,006 | 2/17 | Johnston et al. | 146—189 |
| 2,378,539 | 6/45 | Dawihl | 18—12 |
| 2,469,999 | 5/49 | Stober | 18—12 |
| 2,732,587 | 1/56 | Greene | 18—12 |
| 2,785,438 | 3/57 | Willert | 18—12 |

MICHAEL V. BRINDISI, *Primary Examiner.*

WILLIAM J. STEPHENSON, *Examiner.*